June 25, 1968 R. E. WEAR 3,389,621
BORING TOOLS
Filed Dec. 1, 1965
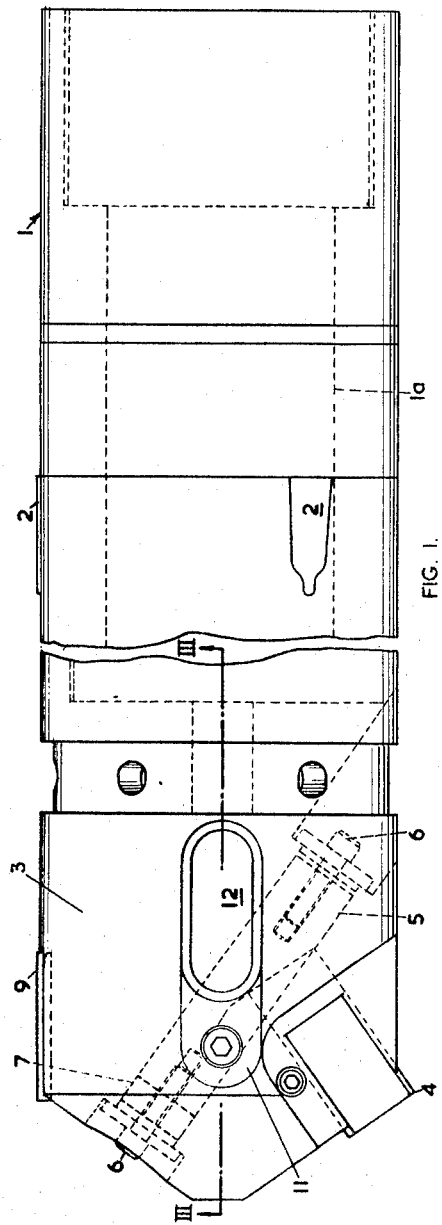
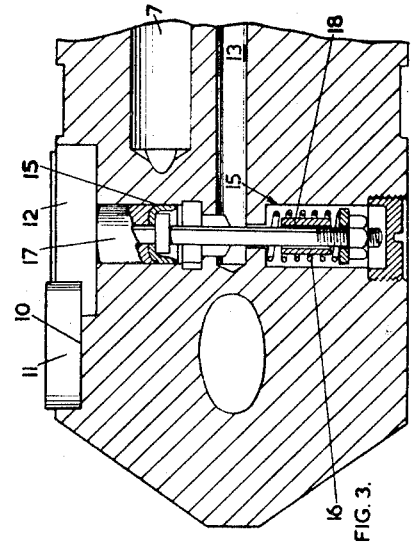
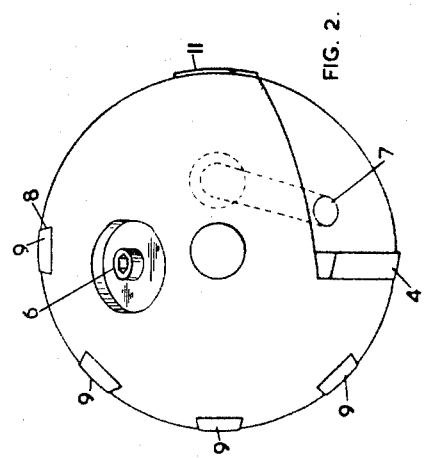
Inventor
Richard Eric Wear
By
Cushman, Darby Cushman
Attorneys

United States Patent Office 3,389,621
Patented June 25, 1968

3,389,621
BORING TOOLS
Richard Eric Wear, Biggin Hill, Kent, England, assignor to Secretary of State for Defence in Her Britannic Majesty's Government of the United Kingdom of Great Britain and Northern Ireland, London, England
Filed Dec. 1, 1965, Ser. No. 511,301
7 Claims. (Cl. 77—58)

ABSTRACT OF THE DISCLOSURE

This invention relates to a cutting head for machining deep bores which has a plurality of burnishing inserts located in its surface, at least one of the inserts being movable radially outward by fluid pressure against the action of a spring. Each such movable insert may be attached to a piston, slidable in a radial bore in the cutting head; the pressure fluid having access to the radial bore on the inner side of the piston to move the piston outward. The piston is biased inwardly by a spring also located in the radial bore.

---

The invention relates to boring tools and is particularly concerned with the machining of deep bores. With a conventional boring bar only comparatively short lengths of bores can be accurately machined since, when the ratio of bore length to bore diameter exceeds say 16:1, the boring bar is not sufficiently rigid to maintain accurate alignment at its cutting tip.

It is an object of the invention to provide a boring tool capable of machining accurately aligned bores with bore length to bore diameter ratios greater than heretofore, for example of a ratio of 50:1 or more.

A boring tool capable of machining deep bores may consist of a cutting head flexibly connected to a boring bar so that the cutting head guides itself along the bore it is forming, the boring bar serving to provide the axial thrust and the torque required for cutting the bore. Such a cutting head may be provided with two sets of burnishing inserts, one set adjacent the cutting tip and the other set spaced axially a distance away towards the boring bar.

According to the invention a cutting head capable of machining deep bores has mounted therein adjacent the cutting tip or tips thereof a number of burnishing inserts of which at least one may be movable radially by fluid pressure to ensure that a number of burnishing inserts at the cutting tip are maintained in contact with the bore to provide accurate location of the cutting head in the bore.

The invention will now be more particularly described, by way of example only, with reference to the accompanying drawings in which:

FIGURE 1 is a plan view of one boring tool according to the invention,

FIGURE 2 is an end view of FIGURE 1, and

FIGURE 3 is a sectional side view taken on the line III—III of FIGURE 1.

As seen in the drawings one form of boring tool consists of a flexible connector 1 provided with an axial bore 1a which is screwed onto the end of a boring bar (not shown) mounted on any suitable machine. Formed in the outer surface of the flexible connector 1 are three equi-spaced recesses which receive burnishing inserts 2. The end of the flexible connector 1 remote from the boring bar is of reduced diameter and is externally screw-threaded to enable a cutting head 3 to be screwed thereon.

This cutting head 3 is of cylindrical shape and carries a cutting tip 4 which may be adjustable by any known means such as a wedge member 5 slidable under the control of screws 6, in a bore 7 located at an angle to the cutting head axis. Machine cutting oil and coolant is fed to the cutting tip 4 through the boring bar (not shown), the bore 1a in the flexible connector 1, and through channels 7 in the cutting head 3. Located in recesses 8 on the outer surface of the cutting head 3 and just axially behind the cutting tip 4 are four burnishing inserts 9, FIGURE 2; one positioned diametrically opposite the cutting tip 4 and the remaining three equi-spaced between them and disposed on one side of the diametral plane through the cutting tip 4. Secured in a recess 10 located on the other side of the diametral plane at 90° to the cutting tip is a lignum vitae burnishing insert 11. Immediately behind this is a movable or floating burnishing insert 12 arranged to be moved radially outwards by the pressure of machine cutting oil acting through channel 13, FIGURE 3, so that when the cutting head 3 is in its operative position in a bore in a workpiece it is held steady in the said bore by the burnishing inserts 9, 12 pressing against the interior wall of the bore. The floating burnishing insert 12 is mounted on a piston rod 14 which slides in a transverse bore 15 and is urged by a helical spring 16 to bias the floating burnishing insert 12 so that it tends to be located just below the top surface of the adjoining fixed burnishing insert 11 until the machine cutting oil reaches a given pressure whereon it acts upon a piston 17 formed on the piston rod 14 underneath the floating burnishing insert 12 and moves the said floating burnishing insert 12 radially outwards. A stop 18 limits the outward movement of the insert 12.

In operation to machine a bore in a workpiece the cutting oil is switched on to half pressure of flow and the cutting head 3 and flexible connector 1 are enclosed in a guiding tube (not shown). This guiding tube guides the cutting head 3 as it enters a bore and provides an accurate location of the mouth of the bore. As the cutting head 3 is traversed along the bore it is cutting, the floating burnishing insert 12 enters the bore; the full pressure or flow of the cutting oil is then allowed to pass to the cutting head 3 and in doing so the floating burnishing insert 12 is moved radially outwards into contact with the bore. Further traversing of the cutting head moves the flexible connector 1 into the bore. At this stage the location and alignment of the cutting head 3 in the bore is provided by the burnishing inserts 9, 12 and 2 in the cutting head 3 and in the flexible connector 1 respectively engaging with the bore. For this reason the burnishing inserts 2 in the flexible connector need to be as remote as possible behind the burnishing inserts 9, 12 in the cutting head.

It is to be understood that although the cutting head of this invention has been described for use in conjunction with a flexible connector it may be used when mounted upon any suitable boring bar.

In a modification the lignum vitae burnishing insert 11 is discarded.

What I claim is:

1. A cutting head for machining a deep bore comprising at least one cutting tip located adjacent the forward end of the head, a plurality of burnishing inserts located in the exterior surface of the cutting head adjacent the forward end thereof and rearward of the cutting means, at least one of said burnishing inserts being movable radially outward by fluid pressure into contact with said bore whereby a plurality of said burnishing inserts are maintained in contact with said bore to provide accurate location of said cutting head therein, and spring means urging said movable insert radially inward.

2. A cutting head according to claim 1 wherein the cutting head is provided with a transverse bore which receives a piston connected to a movable insert and slidable in the said transverse bore, spring means being arranged in the said transverse bore to spring urge the movable insert radially inwards.

3. A cutting head according to claim 2 which further comprises a helical spring located in the transverse bore, a rod extending co-axially from the piston through the centre of the spring, which rod is acted upon by the helical spring to urge the movable insert radially inwards.

4. A cutting head according to claim 3 wherein the cutting head is further provided with a channel which communicates with the transverse bore and through which channel fluid may pass to act on the piston and move the movable insert radially outwards in opposition to the helical spring.

5. A cutting head capable of machining deep bores provided with at least one cutting tip located adjacent the front end of the head, a plurality of burnishing inserts forming part of the exterior surface of the head adjacent the front end thereof and axially behind the said cutting tip, at least one of said inserts being movable radially outward by fluid pressure to ensure that a number of said burnishing inserts are maintained in contact with a bore being machined to provide accurate location therein, and wherein the cutting head is provided with a transverse bore which receives a piston connected to a movable insert and slidable in the said transverse bore, spring means being arranged in the said transverse bore to spring urge the movable insert radially inward.

6. A cutting head according to claim 5 which further comprises a helical spring located in the transverse bore, a rod extending coaxially from the piston through the center of the spring, said rod being acted upon by said helical spring to urge the movable insert radially inwards.

7. A cutting head according to claim 6 wherein the cutting head is further provided with a channel which communicates with the transverse bore and through which channel fluid may pass to act on the piston and move the movable insert radially outwards in opposition to the helical spring.

References Cited

UNITED STATES PATENTS 2,320,333   5/1943   Pierle _____ 77—58

GERALD A. DOST, *Primary Examiner.*